United States Patent
Biran et al.

(10) Patent No.: US 8,037,154 B2
(45) Date of Patent: Oct. 11, 2011

(54) ASYNCHRONOUS DUAL-QUEUE INTERFACE FOR USE IN NETWORK ACCELERATION ARCHITECTURE

(75) Inventors: Giora Biran, Zichron Yaakov (IL);
Zorik Machulsky, Gesher HaZiv (IL);
Vadim Makhervaks, Austin, TX (US);
Renato John Recio, Austin, TX (US);
Julian Satran, Atlit (IL); Leah Shalev, Zichron Yaakov (IL); Ilan Shimony, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1908 days.

(21) Appl. No.: 11/132,854

(22) Filed: May 19, 2005

(65) Prior Publication Data

US 2006/0262782 A1    Nov. 23, 2006

(51) Int. Cl.
*G06F 15/167* (2006.01)
*G06F 15/16* (2006.01)

(52) U.S. Cl. ............ 709/217; 709/212; 709/234

(58) Field of Classification Search ............ 709/217, 709/212, 234
See application file for complete search history.

(56) References Cited

U.S. PATENT DOCUMENTS

| | | | |
|---|---|---|---|
| 5,430,855 A * | 7/1995 | Walsh et al. | 710/10 |
| 6,434,620 B1 * | 8/2002 | Boucher et al. | 709/230 |
| 7,424,710 B1 * | 9/2008 | Nelson et al. | 718/1 |
| 2004/0042483 A1 * | 3/2004 | Elzur et al. | 370/463 |
| 2005/0204058 A1 * | 9/2005 | Philbrick et al. | 709/238 |
| 2005/0220128 A1 * | 10/2005 | Tucker et al. | 370/412 |
| 2005/0246443 A1 * | 11/2005 | Yao et al. | 709/227 |
| 2006/0067346 A1 * | 3/2006 | Tucker et al. | 370/412 |
| 2006/0075142 A1 * | 4/2006 | Cornett et al. | 709/246 |
| 2009/0063696 A1 * | 3/2009 | Wang et al. | 709/232 |

FOREIGN PATENT DOCUMENTS

| | | | |
|---|---|---|---|
| WO | WO0243320 | * | 5/2002 |
| WO | WO03071419 | * | 8/2003 |
| WO | WO2004021628 | * | 3/2004 |

OTHER PUBLICATIONS

AA "TCP Servers: Offloading TCP Processing in Internet Servers. Deisgn, Implementation, and Performance", Mar. 15, 2002, p. 1-23.*
Regnier, Greg et al., "ETA: Experience with an Intel Xeon Processor as a Packet Processing Engine", Micro, IEEE, Publication Date: Jan.-Feb. 2004, vol. 24, Issue 1, pp. 24-31.

* cited by examiner

*Primary Examiner* — Karen Tang

(57) ABSTRACT

A method for receiving data in a network acceleration architecture for use with TCP (transport control protocol), iSCSI (Internet Small Computer System Interface) and RDMA (Remote Direct Memory Access) over TCP, including providing a hardware acceleration engine, called a streamer, adapted for communication with and processing data from a consumer application in a system that supports TCP, iSCSI and RDMA over TCP, providing a software protocol processor adapted for carrying out TCP implementation, the software control processor being called a TCE (TCP Control Engine), and providing an asynchronous dual-queue interface for exchanging information between the streamer and TCE, wherein the streamer and TCE are adapted to operate asynchronously and independently of one another.

17 Claims, 3 Drawing Sheets

ASYNCHRONOUS DUAL-QUEUE INTERFACE FOR USE IN NETWORK ACCELERATION ARCHITECTURE

FIELD OF THE INVENTION

The present invention relates generally to network acceleration, and more particularly to a network acceleration architecture which allows efficient iSCSI (Internet Small Computer System Interface) and RDMA (Remote Direct Memory Access) acceleration, preserves flexibility of TCP (transport control protocol) implementation, and adapts to increasing main CPU (central processing unit) speed, memory bandwidth and latency.

BACKGROUND OF THE INVENTION

RDMA is a technique for efficient movement of data over high-speed transports. RDMA enables a computer to directly place information in another computer's memory with minimal demands on memory bus bandwidth and CPU processing overhead, while preserving memory protection semantics. RNIC is a Network Interface Card that provides RDMA services to the consumer. The RNIC may provide support for RDMA over TCP.

RNIC can serve as an iSCSI target or initiator adapter. "Initiator" refers to a SCSI command requester (e.g., host), and "target" refers to a SCSI command responder (e.g., I/O device, such as SCSI drives carrier, tape).

Much work has been done to create efficient, scalable and flexible RDMA and iSCSI acceleration solutions, but a successful solution is not trivial. One challenge is that all data processing operations must be handled efficiently, while at the same time, the protocol implementation must be flexible. The need for flexibility in protocol implementation is particularly important for TCP, which constantly evolves, attempting to adapt TCP behavior to changing network speed, traffic pattern and a network infrastructure. Another challenge is the ability to adapt to increases in main CPU speed, main memory bandwidth and latency.

One example of a prior art solution, which uses RNICs for network acceleration, is that of embedded processors that handle protocol processing. One or more embedded CPUs are tightly coupled with the data path, and touch each incoming and generated packet. There are different hardware acceleration engines surrounding such embedded CPUs, which assist in different data processing operations. Such a solution is generally limited by the embedded CPU capabilities, which typically lag behind the main CPU technology for several generations. This limits the performance benefits and lifetime of such solutions. Latency is relatively high, since before the packet is generated to the network or placed to the memory, it has to be processed by one or more CPUs. To reach high networking rates, multiple CPUs need to be placed on the data path and perform simultaneous handling of multiple packets. This adds additional latency, makes implementation difficult and increases the cost of the overall solution.

Another prior art solution is a state machine implementation. However, this lacks flexibility in protocol processing, which as mentioned previously, is particularly important in TCP.

SUMMARY OF THE INVENTION

The present invention seeks to provide an improved TCP, RDMA and iSCSI network acceleration architecture, as is described more in detail hereinbelow.

In accordance with a non-limiting embodiment of the invention, heavy data intensive operations are separated from the protocol control. Data processing may include "fast path" execution (defined in the description below) performed by a dedicated hardware acceleration engine, whereas the protocol control operations may be carried out by software. The split of functions between software and hardware is done in such way that allows asynchronous and independent operation of the data processing (hardware) and the protocol control (software). There is a "loose" coupling of the software and hardware components. The invention preserves flexibility in protocol implementation and is capable of sustaining protocol modification, without sacrificing performance and efficiency.

In accordance with a non-limiting embodiment of the invention, a hardware acceleration engine, called a streamer, may communication with and process data from a consumer application, and a software protocol processor, called a TCE (TCP Control Engine), may carry out TCP implementation. An asynchronous dual-queue interface is provided for exchanging information between the streamer and TCE, wherein the streamer and TCE are adapted to operate asynchronously and independently of one another.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
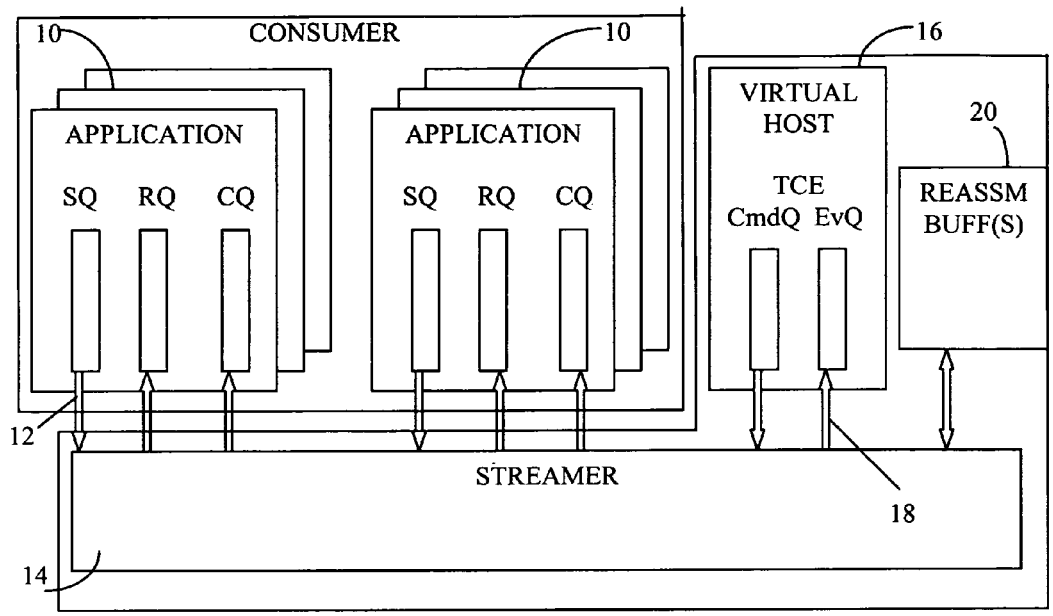
FIG. 1 is a simplified block diagram of a network acceleration architecture in accordance with an embodiment of the present invention.

Reference is now made to FIG. 1, which illustrates a network acceleration architecture in accordance with an embodiment of the present invention.

The network acceleration architecture may include consumer applications 10, which may run on a main CPU complex. The consumer applications 10 may use asynchronous queue based interface(s) 12 to submit work requests to a hardware acceleration engine 14, also referred to as a streamer 14. The interface(s) 12 may be in accordance with the RDMA verb specification.

As is known in the art, RDMA uses an operating system programming interface, referred to as "verbs", to place work requests (WRs) onto a work queue. In brief, queue pairs may be used to transfer messages to the streamer 14 (e.g., memory regions in the streamer 14). Each queue pair may include a send work queue (SQ) and a receive work queue (RQ). For example, the consumer application 10 may generate work requests, which are placed onto a work queue as work queue elements (WQEs). Accordingly, the send work queue may include WQEs that describe data to be transmitted to the streamer 14, and the receive work queue may include WQEs that describe where to place incoming data from the streamer 14. A completion queue may include completion queue elements (CQEs) that contain information about previously completed work queue elements. A completion queue element is a data structure on a completion queue that contains sufficient information to determine the queue pair and specific work queue element that has been completed.

The interface(s) 12 may enable using iSCSI and socket acceleration mechanisms provided by the streamer 14. For example, the streamer 14 may be implemented as an RNIC, which as mentioned above, may provide support for RDMA over TCP and may serve as an iSCSI target or initiator adapter. The RNIC can also provide iSER ("iSCSI Extensions for RDMA") services. iSER is an extension of the data transfer model of iSCSI, which enables the iSCSI protocol to take advantage of the direct data placement technology of the RDMA protocol. iSCSI protocol exchanges iSCSI Protocol Data Units (PDUs) to execute SCSI commands provided by the SCSI layer. The iSER data transfer protocol may slightly change or adapt iSCSI implementation over RDMA; e.g., it eliminates such iSCSI PDUs as DataOut and DataIn, and instead uses RDMA Read and RDMA Write messages. Basically iSER presents iSCSI-like capabilities to the upper layers, but the protocol of data movement and wire protocol is different.

In short, iSCSI uses regular TCP connections, whereas iSER implements iSCSI over RDMA. iSER uses RDMA connections and takes advantage of different RDMA capabilities to achieve better recovery capabilities, improve latency and performance. Since RNIC supports both iSCSI and iSER services, it enables SCSI communication with devices that support different levels of iSCSI implementation. Protocol selection (iSCSI vs. iSER) is carried out on the iSCSI login phase.

The hardware acceleration engine 14 cooperates with a software protocol processor 16, also referred to as a TCP Control Engine (TCE) 16, to provide network acceleration semantics to consumer applications 10. The hardware acceleration engine 14 is responsible to handle data intensive operations, as described in more detail hereinbelow.

TCE 16 is a software component that implements a protocol processing part of the network acceleration solution. This software component implements the decision making part of the TCP protocol. For example, without limitation, TCE 16 may run on a main CPU, dedicated CPU, or on a dedicated virtual host (partition). Streamer 14 and TCE 16 may use an asynchronous dual-queue interface 18 to exchange information between software and hardware parts of solution. The dual-queue interface 18 may include two unidirectional queues and is described more in detail hereinbelow with reference to FIG. 3.

A command queue (CmdQ) may be used to pass information from the TCE 16 to the streamer 14. An event queue (EvQ) may be used to pass information from the streamer 14 to the TCE 16. Streamer 14 and TCE 16 may work asynchronously without any need to serialize and/or synchronize operations between them. The architecture does not put restrictions or make assumptions regarding the processing/interface latency between the hardware acceleration engine 14 and the software protocol processor 16.

Figure 2:
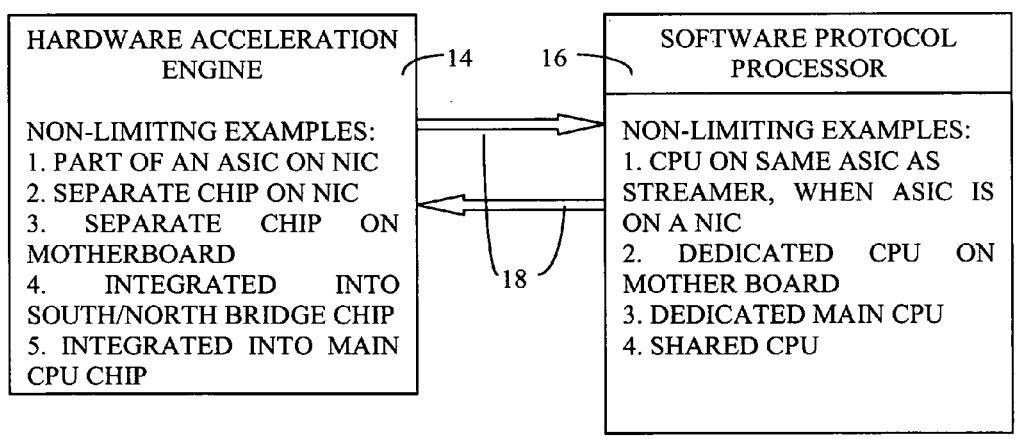
FIG. 2 is a simplified block diagram of different configurations for the streamer and TCE of the network acceleration architecture of FIG. 1.

As seen in FIG. 2, such an architecture allows a wide range of different configurations. For example, without limitation, the hardware acceleration engine 14 can be implemented in an ASIC (application specific integrated circuit), a NIC (network interface card), a chip on a mother board, a PCI (peripheral component interconnect) bus controller chipset, south/north bridges, or be integrated in the CPU. The software protocol processor 16, without limitation, can run on an embedded CPU on the NIC, a dedicated special purpose CPU on the mother board, a dedicated general-purpose main CPU (e.g., in a multi-CPU system), or share the same CPU with applications running on a dedicated virtual host or partition. The invention allows any type of interconnect between the streamer 14 and TCE 16.

As mentioned above, in the network acceleration architecture of the present invention, the data intensive operations are separated from the complex TCP protocol processing. In simplistic terms, receiving and processing a TCP segment may be split into three parts:

1. Fast-Path Segment Validation, Followed by Data Processing, Placement and Delivery if Validation Passed.

The fast-path segment validation sequence may include several basic checks that are sufficient to allow placement and delivery of the segment which passed them. Any segment which fails this sequence is not necessarily an invalid segment, but requires enhanced validation sequence to be applied. The streamer 14 may perform the fast-path segment validation.

The TCP segment is identified to be a fast-path segment if it passes a predefined TCP validation sequence (described in detail below). Accordingly, "fast path" as used throughout the specification and claims refers to handling and/or processing of a segment that has passed a predefined TCP validation sequence. This validation sequence is sufficient to identify a segment to be a valid TCP segment, which then permits the segment to undergo post processing, placement to consumer buffers and delivery without software (TCE) involvement.

If the segment does not pass fast-path validation, the segment is treated as a slow-path segment, and is passed through the reassembly buffers 20. Note that in some cases a valid TCP segment can fail a fast-validation sequence and be handled in slow path. Accordingly, "slow path" as used throughout the specification and claims refers to handling and/or processing of a segment that has not passed the predefined TCP validation sequence used for the fast path.

The streamer 14 may separate the TCP header and payload of each inbound TCP segment (both fast and slow paths), and pass the TCP header with additional information to the TCE 16 for further processing via the EvQ interface.

The payload of the segment which passed fast-path validation may be processed by streamer 14. This may include processing of the RDMA/iSCSI and Socket ULP, depending on the connection type. The ULP processing may be carried out in any suitable manner; the details of the ULP processing are not within the scope of the invention. After processing ULPs, the payload may be placed in consumer buffers (depending on the ULP) and delivered to the consumer.

2. Enhanced Segment Validation

This validation sequence includes various extended checks that cover different cases not covered by the fast-path segment validation. This validation sequence is implemented by TCE 16, and the payloads of segments requiring such validation are temporary stored in the reassembly buffers 20.

3. Implementation of TCP Protocol—Congestion Window Management, Timer Management, RTTM (Round Trip Time Measurement) Estimation, Retransmit Management, etc.

This part of the receive flow may be implemented by TCE 16. It may be carried out asynchronously with the data processing performed by streamer 14, and does not affect/delay data placement and delivery on the fast path.

In simplistic terms, transmitting TCP segments may be accomplished by streamer 14 directly communicating with a consumer by means of a connection context, wherein streamer 14 may use information from the connection context to generate TCP segments and calculate the amount of segments that can be generated for the given connection context. The information in the connection context may be asynchronously (with respect to streamer 14) updated by TCE 16, which may use special context update requests passed via CmdQ interface.

In accordance with another non-limiting embodiment of the present invention, transmitting a TCP segment may be accomplished wherein TCE 16 acts as a mediator between the consumer and streamer 14. TCE 16 may handle consumer doorbells and post transmit requests to the streamer via the CmdQ interface. The consumer queue based interface is still implemented by streamer 14.

Figure 3:
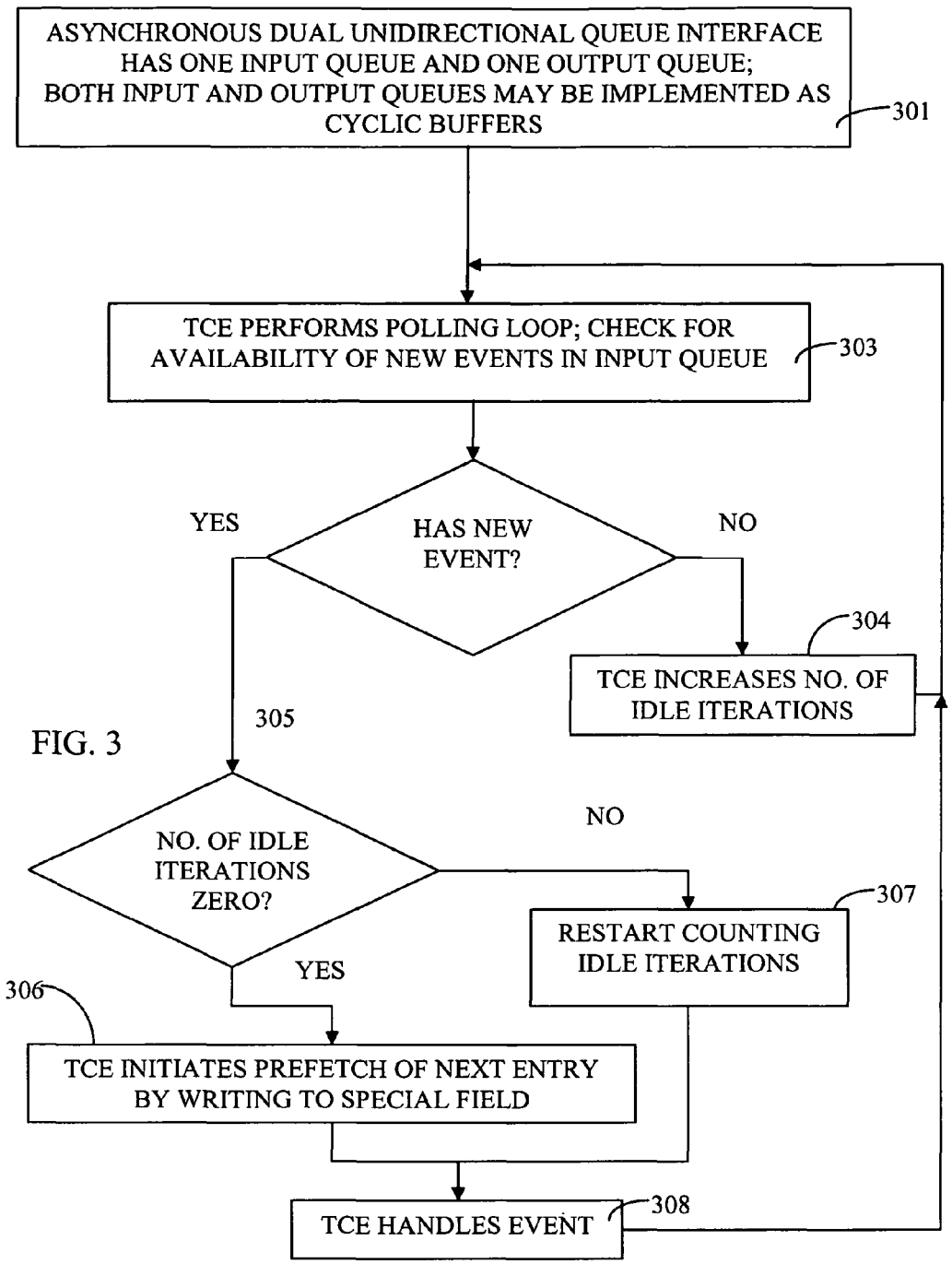
FIG. 3 is a simplified flow chart of non-limiting methods of using an asynchronous dual-queue interface to exchange information between software and hardware parts of the network acceleration architecture, in accordance with an embodiment of the present invention.

Reference is now made to FIG. 3, which illustrates non-limiting methods of using the asynchronous dual-queue interface 18 to efficiently exchange information between streamer 14 and TCE 16, in accordance with an embodiment of the present invention.

As mentioned above, the asynchronous dual unidirectional queue interface 18 has one input queue and one output queue interface makes it possible to implement TCE 16 in an efficient polling mode, reducing and possibly avoiding interrupts. Both the input and output queues may be implemented as cyclic buffers (301). (Throughout the specification and claims, the term "cyclic buffer" encompasses cyclic buffers or other similar data structure in main memory.) This allows using advanced cache prefetch techniques, taking advantage of direct cache access and cache locking operations that are available on some systems.

Cache prefetch of the Event Queue (TCE input queue) may be performed in the following way. TCE 16 may perform a polling loop, checking for availability of the new events in the input queue (303). Depending on the queue implementation, the TCE 16 may either have precise information on the available events number, or it may just poll the status of the next expected event entry. In the latter case, TCE counts the number of consecutive idle iterations in the polling loop (i.e., the number of times it tried to read an event which was not available yet), until it finally receives an event. If no new event is detected, the TCE 16 may increase the number of idle iterations (step 304) and resume checking for the availability of new events. When TCE 16 detects a new event (#n) (step 305), if the number of idle iterations was zero, the TCE 16 may initiate prefetch of the next event (#n+1) by writing to a special field in the next event entry (306), which is not utilized by the hardware and therefore is safe in the race condition that occurs when the TCE 16 initiates the prefetch concurrently with the streamer 14 that actually generates the event. (The prefetch may be attempted only if the next event is located in a different cache line.) The write operation may be performed asynchronously with respect to streamer 14. Accordingly, TCE 16 may proceed with processing event #n (step 308) while event #n+1 is being prefetched. If the number of idle iterations was not zero, then the TCE 16 may restart counting the idle iterations (step 307) and proceed with processing event #n (step 308).

Figure 4:
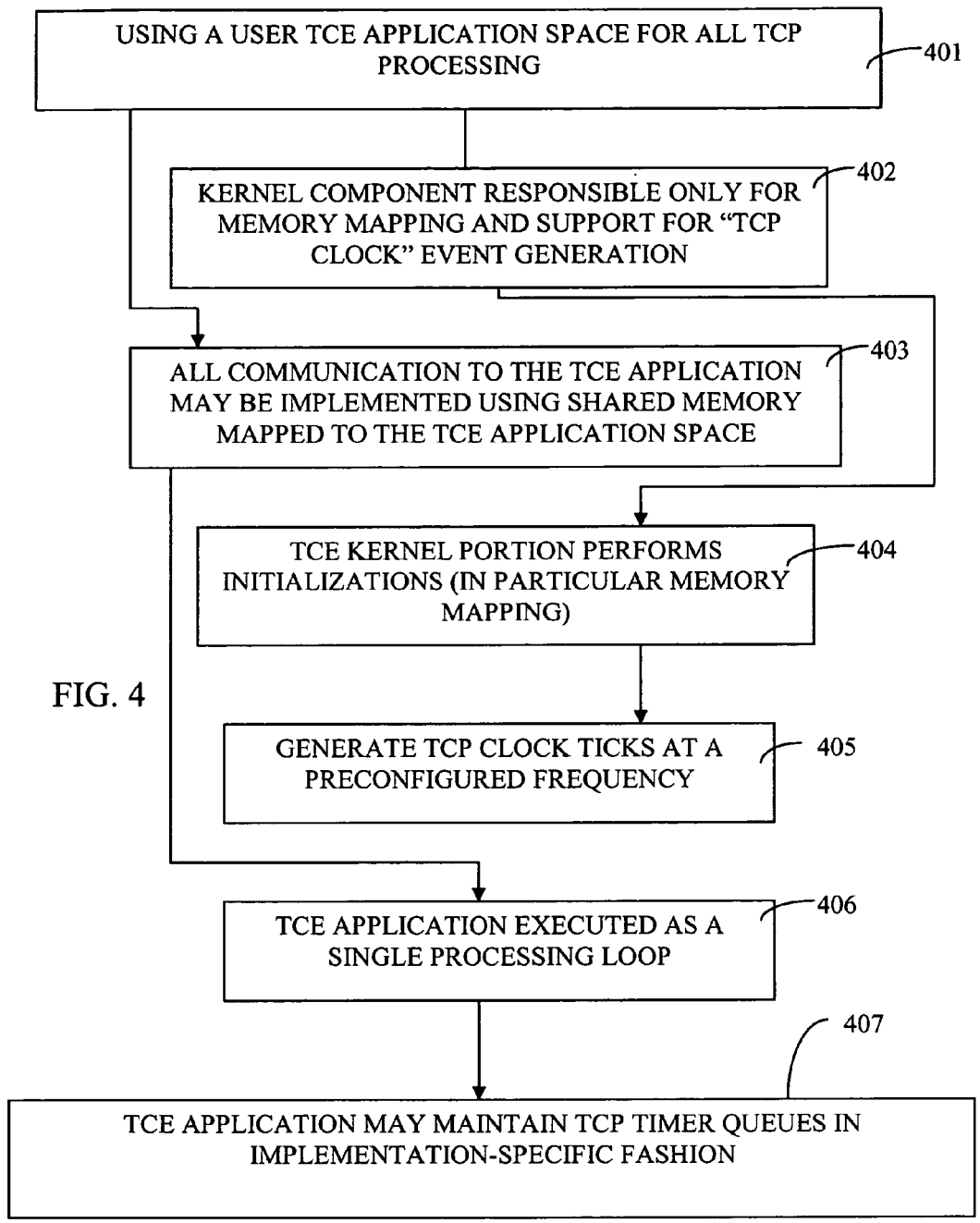
FIG. 4 is a simplified flow chart of an efficient user-space implementation of the asynchronous dual-queue interface to exchange information between the software and hardware parts of the network acceleration architecture, in accordance with another embodiment of the present invention.

Reference is now made to FIG. 4, which illustrates an efficient user-space implementation of the asynchronous dual-queue interface 18 to exchange information between software and hardware parts of the network acceleration architecture, in accordance with an embodiment of the present invention.

In order to increase robustness and to facilitate development, it may be desirable to implement the TCE 16 (or most of the TCE 16) in user-space rather than kernel. This may be accomplished by using a user TCE application space for all or most TCP processing (401), and a kernel component (also referred to as kernel portion) responsible only for memory mapping and support for "TCP clock" event generation (402). All communication to the TCE application may be implemented using shared memory mapped to the TCE application space (403). This memory may be used to pass various information to TCE 16, such as but not limited to, necessary connection information, the streamer interface and "TCP clock" ticks. Accordingly, queues and other memory-mapped parts of the streamer interface (e.g., connection contexts, control registers, and others) may be used directly by the user-space TCE.

The TCE kernel portion may perform the initializations (in particular memory mapping) (404), and afterwards may generate TCP clock ticks at a preconfigured frequency (e.g., every 10 msec) (405). The ticks may be implemented as a separate event queue.

The TCE application may be executed as a single processing loop (406), using the information in the shared memory to poll status of the event queue for streamer-generated events, and to poll for TCP clock ticks. The TCE application may maintain TCP timer queues in implementation-specific fashion (407), e.g., by using a delta list of connection contexts according to their timeout expiration time. The TCE application does not have to directly use the OS timer services. Upon each tick event received from the kernel portion of the TCE 16, the TCE application may check whether any TCP timer expired for any connection, and handle them if needed.

Locking of TCP data structures is not necessary because all processing is done serially (in the same processing loop). This may also provide performance benefits when TCE 16 is implemented in kernel.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for transmitting data in a network acceleration architecture, comprising:
 performing TCP operations to transfer data using a hardware acceleration engine, which communicates with a consumer application running on a main CPU complex via a first asynchronous queue interface comprising a send work queue, a receive work queue, and a completion queue, and which is implemented as a separate chip from the main CPU complex;
 running a software protocol processor on a dedicated CPU, which is distinct from the hardware acceleration engine and the CPU running the consumer application, to carry out TCP implementation while operating asynchronously and independently of said hardware acceleration engine; and
 exchanging information between said hardware acceleration engine and said software protocol processor via a second asynchronous queue interface, comprising a command queue and an event queue.

2. The method according to claim 1, comprising implementing said command and event queues as cyclic buffers.

3. The method according to claim 2, further comprising performing cache prefetch of said event queue.

4. The method according to claim 3, wherein performing cache prefetch of said event queue comprises said software protocol processor performing a polling loop and checking for availability of new events in said input queue, and upon detecting a new event (#n), initiating prefetch of a next event (#n+1).

5. The method according to claim 4, wherein initiating prefetch of the next event (#n+1) comprises writing to a special field in a next event entry, which is not utilized by said hardware acceleration engine.

6. The method according to claim 5, comprising writing to the special field asynchronously with respect to said hardware acceleration engine.

7. The method according to claim 5, comprising said software protocol processor processing event #n while next event #n+1 is being prefetched.

8. The method according to claim 3, wherein said software protocol processor decides whether to initiate performing the cache prefetch.

9. The method according to claim 8, wherein said software protocol processor decides whether an event entry #n+1 is available by counting a number of times said software protocol processor tried to read an event which was not available yet until finally receiving an event #n, and initiating the cache prefetch only if the event was received without retries.

10. The method according to claim 1, wherein the software protocol processor is implemented by a user space TCE application for TCP processing.

11. The method according to claim 10, and comprising using a kernel portion for memory mapping and support for "TCP clock" event generation.

12. The method according to claim 10, comprising mapping shared memory to a TCE application space, and using said shared memory to pass information to said software protocol processor.

13. The method according to claim 12, comprising executing said TCE application as a single processing loop, using the information in the shared memory to poll status of the input queue for events generated by said hardware acceleration engine and to poll for TCP clock ticks.

14. The method according to claim 11, comprising said kernel portion generating TCP clock ticks at a preconfigured frequency, said ticks being implemented as a separate event queue.

15. The method according to claim 13, wherein said TCE application provides a lock-free implementation of TCP processing by said TCE.

16. A system for transmitting data in a network acceleration architecture, comprising:

a hardware acceleration engine, which is configured to perform TCP operations to transfer data while communicating with a consumer application running on a main CPU complex via a first asynchronous queue interface comprising a send work queue, a receive work queue, and a completion queue, and which is implemented as a separate chip from the main CPU complex;

a dedicated CPU, which is distinct from the hardware acceleration engine and the CPU running the consumer application, running a software protocol processor adapted for carrying out TCP implementation while operating asynchronously and independently of said hardware acceleration engine; and a second asynchronous queue interface, comprising a command queue and an event queue, for exchanging information between said hardware acceleration engine and said software protocol processor.

17. The system according to claim 16, wherein the software protocol processor is implemented by a user space TCE application adapted for TCP processing.

* * * * *